US010225328B2

(12) United States Patent
Fuzell-Casey et al.

(10) Patent No.: US 10,225,328 B2
(45) Date of Patent: *Mar. 5, 2019

(54) MUSIC SELECTION AND ORGANIZATION USING AUDIO FINGERPRINTS

(71) Applicant: APERTURE INVESTMENTS, LLC, Mercer Island, WA (US)

(72) Inventors: Jacquelyn Fuzell-Casey, Mercer Island, WA (US); Skyler Fuzell-Casey, Portland, OR (US); Timothy D. Casey, Mercer Island, WA (US)

(73) Assignee: APERTURE INVESTMENTS, LLC, Mercer Island, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/868,902

(22) Filed: Jan. 11, 2018

(65) Prior Publication Data

US 2018/0139268 A1 May 17, 2018

Related U.S. Application Data

(63) Continuation-in-part of application No. 14/671,979, filed on Mar. 27, 2015, and a continuation-in-part of (Continued)

(51) Int. Cl.
*G06K 9/00* (2006.01)
*H04L 29/08* (2006.01)
(Continued)

(52) U.S. Cl.
CPC ........ *H04L 67/10* (2013.01); *G06F 17/30743* (2013.01); *G06F 17/30775* (2013.01);
(Continued)

(58) Field of Classification Search
None
See application file for complete search history.

(56) References Cited

U.S. PATENT DOCUMENTS 5,561,649 A 10/1996 Lee
6,151,571 A 11/2000 Pertrushin
(Continued)

OTHER PUBLICATIONS www.picitup.com; Picitup's; PicColor product; copyright 2007-2010; accessed Feb. 2, 2015; 1 page.
(Continued)

*Primary Examiner* — Delomia L Gilliard
(74) *Attorney, Agent, or Firm* — Baker & Hostetler LLP

(57) ABSTRACT

A content selection system and method for identifying and organizing moods in content using objectively measured scores for rhythm, texture and pitch (RTP) and clustered into six mood classifications based on an objective analysis of the measured scores. Digitized representations of the content may also be identified and organized based on the content's frequency data, three-dimensional shapes derived from the digitized representations, and colors derived from the frequency data. Each piece of content may be identified by at least a mood shape, but may also be identified by a mood color and/or a mood based on the clustered RTP scores and/or the digitized representation. Users of the selection system may be able to view the moods identified in the different manners, or combinations of two or three mood identifying manners and select and organize content based on the identified moods.

20 Claims, 11 Drawing Sheets

Related U.S. Application Data application No. 14/671,973, filed on Mar. 27, 2015, now Pat. No. 9,875,304, which is a continuation-in-part of application No. 14/603,324, filed on Jan. 22, 2015, and a continuation-in-part of application No. 14/603,325, filed on Jan. 22, 2015, and a continuation-in-part of application No. 13/828,656, filed on Mar. 14, 2013, now Pat. No. 9,639,871, said application No. 14/603,324 is a continuation-in-part of application No. 13/828,656.

(60) Provisional application No. 61/971,490, filed on Mar. 27, 2014, provisional application No. 61/930,442, filed on Jan. 22, 2014, provisional application No. 61/930,444, filed on Jan. 22, 2014.

(51) Int. Cl.
  *G06F 17/30* (2006.01)
  *G11B 27/00* (2006.01)
  *H04L 29/06* (2006.01)

(52) U.S. Cl.
  CPC ........ *G06F 17/30817* (2013.01); *G11B 27/00* (2013.01); *H04L 65/00* (2013.01); *H04L 67/20* (2013.01); *H04L 67/22* (2013.01); *H04L 67/306* (2013.01)

(56) References Cited

U.S. PATENT DOCUMENTS

| | | |
|---|---|---|
| 6,411,289 B1 | 6/2002 | Zimmerman |
| 6,464,585 B1 | 10/2002 | Miyamoto et al. |
| 6,539,395 B1 | 3/2003 | Gjerdingen et al. |
| 6,657,117 B2 | 12/2003 | Weare et al. |
| 6,748,395 B1 | 6/2004 | Picker et al. |
| 6,964,023 B2 | 11/2005 | Maes et al. |
| 6,993,532 B1 | 1/2006 | Platt et al. |
| 7,022,907 B2 | 4/2006 | Lu et al. |
| 7,024,424 B1 | 4/2006 | Platt et al. |
| 7,080,324 B1 | 7/2006 | Nelson et al. |
| 7,115,808 B2 | 10/2006 | Lu et al. |
| 7,205,471 B2 | 4/2007 | Looney et al. |
| 7,206,775 B2 | 4/2007 | Kaiser et al. |
| 7,227,074 B2 | 6/2007 | Ball |
| 7,233,684 B2 | 6/2007 | Fedorovskaya et al. |
| 7,296,031 B1 | 11/2007 | Platt et al. |
| 7,396,990 B2 | 7/2008 | Lu et al. |
| 7,424,447 B2 | 9/2008 | Fuzell-Casey et al. |
| 7,427,708 B2 | 9/2008 | Ohmura |
| 7,485,796 B2 | 2/2009 | Myeong et al. |
| 7,541,535 B2 | 6/2009 | Ball |
| 7,562,032 B2 | 7/2009 | Abbosh et al. |
| 7,582,823 B2 | 9/2009 | Kim et al. |
| 7,626,111 B2 | 12/2009 | Kim et al. |
| 7,756,874 B2 | 7/2010 | Hoekman et al. |
| 7,765,491 B1 | 7/2010 | Cotterill |
| 7,786,369 B2 | 8/2010 | Eom et al. |
| 7,809,793 B2 | 10/2010 | Kimura et al. |
| 7,822,497 B2 | 10/2010 | Wang |
| 7,858,868 B2 | 12/2010 | Kemp et al. |
| 7,921,067 B2 | 4/2011 | Kemp et al. |
| 8,013,230 B2 | 9/2011 | Eggink |
| 8,229,935 B2 | 7/2012 | Lee et al. |
| 8,248,436 B2 | 8/2012 | Kemp et al. |
| 8,260,778 B2 | 9/2012 | Ghatak |
| 8,269,093 B2 | 9/2012 | Naik et al. |
| 8,346,801 B2 | 1/2013 | Hagg et al. |
| 8,354,579 B2 | 1/2013 | Park et al. |
| 8,390,439 B2 | 3/2013 | Cruz-Hernandez et al. |
| 8,407,224 B2 | 3/2013 | Bach et al. |
| 8,410,347 B2 | 4/2013 | Kim et al. |
| 8,505,056 B2 | 8/2013 | Cannistraro et al. |
| 8,686,270 B2 | 4/2014 | Eggink et al. |
| 8,688,699 B2 | 4/2014 | Eggink et al. |
| 8,855,798 B2 | 10/2014 | Dimaria et al. |
| 8,965,766 B1 | 2/2015 | Weinstein et al. |
| 9,165,255 B1 | 10/2015 | Shetty et al. |
| 9,195,649 B2 | 11/2015 | Neuhasuer et al. |
| 9,788,777 B1 | 10/2017 | Knight et al. |
| 9,830,896 B2 | 11/2017 | Wang et al. |
| 9,842,146 B2 | 12/2017 | Chen et al. |
| 2003/0045953 A1 | 3/2003 | Weare |
| 2003/0133700 A1 | 7/2003 | Uehara |
| 2003/0221541 A1 | 12/2003 | Platt |
| 2005/0065781 A1 | 3/2005 | Tell et al. |
| 2005/0109194 A1 | 5/2005 | Gayama |
| 2005/0109195 A1 | 5/2005 | Haruyama et al. |
| 2005/0211071 A1 | 9/2005 | Lu et al. |
| 2005/0234366 A1 | 10/2005 | Heinz et al. |
| 2005/0241465 A1 | 11/2005 | Goto |
| 2006/0047649 A1 | 3/2006 | Liang |
| 2006/0096447 A1 | 5/2006 | Weare et al. |
| 2006/0143647 A1* | 6/2006 | Bill ................... G06F 17/30743 725/10 |
| 2006/0170945 A1 | 8/2006 | Bill |
| 2007/0079692 A1 | 4/2007 | Glatt |
| 2007/0107584 A1 | 5/2007 | Kim et al. |
| 2007/0113725 A1 | 5/2007 | Oliver et al. |
| 2007/0113726 A1 | 5/2007 | Oliver et al. |
| 2007/0131096 A1 | 6/2007 | Lu et al. |
| 2008/0021851 A1 | 1/2008 | Alcalde et al. |
| 2008/0040362 A1 | 2/2008 | Aucouturier et al. |
| 2008/0184167 A1 | 7/2008 | Berrill et al. |
| 2008/0189754 A1* | 8/2008 | Yoon ................... G11B 27/3027 725/105 |
| 2008/0235284 A1 | 9/2008 | Aarts et al. |
| 2008/0253695 A1 | 10/2008 | Sano et al. |
| 2008/0300702 A1 | 12/2008 | Gomez et al. |
| 2008/0314228 A1* | 12/2008 | Dreyfuss ................ G09B 15/00 84/477 R |
| 2009/0069914 A1 | 3/2009 | Kemp et al. |
| 2009/0071316 A1 | 3/2009 | Oppenheimer |
| 2009/0182736 A1 | 7/2009 | Ghatak |
| 2009/0234888 A1 | 9/2009 | Holmes et al. |
| 2010/0011388 A1 | 1/2010 | Bull et al. |
| 2010/0042932 A1 | 2/2010 | Lehtiniemi et al. |
| 2010/0053168 A1 | 3/2010 | Kemp et al. |
| 2010/0086204 A1 | 4/2010 | Lessing |
| 2010/0091138 A1 | 4/2010 | Nair |
| 2010/0094441 A1 | 4/2010 | Mochizuki et al. |
| 2010/0223128 A1 | 9/2010 | Dukellis et al. |
| 2010/0223223 A1 | 9/2010 | Sandler et al. |
| 2010/0253764 A1 | 10/2010 | Sim et al. |
| 2010/0260363 A1 | 10/2010 | Glatt et al. |
| 2010/0325135 A1 | 12/2010 | Chen et al. |
| 2011/0112671 A1 | 5/2011 | Weinstein |
| 2011/0184539 A1 | 7/2011 | Agevik et al. |
| 2011/0191674 A1 | 8/2011 | Rawley et al. |
| 2011/0202567 A1 | 8/2011 | Bach et al. |
| 2011/0239137 A1 | 9/2011 | Bill |
| 2011/0242128 A1 | 10/2011 | Kang |
| 2011/0252947 A1 | 10/2011 | Eggink et al. |
| 2011/0252951 A1 | 10/2011 | Leavitt et al. |
| 2011/0271187 A1 | 11/2011 | Sullivan et al. |
| 2011/0289075 A1 | 11/2011 | Nelson |
| 2011/0314039 A1 | 12/2011 | Zheleva et al. |
| 2012/0090446 A1 | 4/2012 | Moreno et al. |
| 2012/0132057 A1 | 5/2012 | Kristensen |
| 2012/0172059 A1 | 7/2012 | Kim et al. |
| 2012/0179693 A1 | 7/2012 | Knight et al. |
| 2012/0179757 A1 | 7/2012 | Jones et al. |
| 2012/0197897 A1 | 8/2012 | Knight et al. |
| 2012/0226706 A1 | 9/2012 | Choi et al. |
| 2012/0260789 A1 | 10/2012 | Ur et al. |
| 2012/0272185 A1 | 10/2012 | Dodson et al. |
| 2012/0296908 A1 | 11/2012 | Bach et al. |
| 2013/0032023 A1 | 2/2013 | Pulley et al. |
| 2013/0086519 A1* | 4/2013 | Fino ................... G06Q 30/02 715/810 |
| 2013/0138684 A1 | 5/2013 | Kim et al. |
| 2013/0167029 A1 | 6/2013 | Friesen et al. |
| 2013/0173526 A1 | 7/2013 | Wong et al. |

(56) References Cited

U.S. PATENT DOCUMENTS

| | | |
|---|---|---|
| 2013/0178962 A1 | 7/2013 | DiMaria et al. |
| 2013/0204878 A1 | 8/2013 | Kim et al. |
| 2013/0205223 A1 | 8/2013 | Gilbert |
| 2013/0247078 A1 | 9/2013 | Nikankin et al. |
| 2014/0052731 A1 | 2/2014 | Dahule et al. |
| 2014/0080606 A1 | 3/2014 | Gillet et al. |
| 2014/0085181 A1 | 3/2014 | Roseway et al. |
| 2014/0094156 A1* | 4/2014 | Uusitalo ............ H04W 4/20 455/418 |
| 2014/0180673 A1* | 6/2014 | Neuhauser ............ G10L 19/018 704/9 |
| 2014/0282237 A1 | 9/2014 | Fuzell-Casey |
| 2014/0310011 A1 | 10/2014 | Biswas et al. |
| 2014/0372080 A1 | 12/2014 | Chu |
| 2015/0078583 A1 | 3/2015 | Ball et al. |
| 2015/0081064 A1 | 3/2015 | Ball et al. |
| 2015/0081065 A1 | 3/2015 | Ball et al. |
| 2015/0081613 A1 | 3/2015 | Ball et al. |
| 2015/0134654 A1 | 5/2015 | Fuzell-Casey |
| 2015/0179156 A1 | 6/2015 | Uemura et al. |
| 2015/0205864 A1* | 7/2015 | Fuzell-Casey .... G06F 17/30743 707/738 |
| 2015/0220633 A1* | 8/2015 | Fuzell-Casey .... G06F 17/30743 707/748 |
| 2016/0110884 A1 | 4/2016 | Fuzell-Casey |
| 2016/0125863 A1 | 5/2016 | Henderson |
| 2016/0203805 A1 | 7/2016 | Strachan |
| 2016/0329043 A1 | 11/2016 | Kim et al. |
| 2016/0372096 A1 | 12/2016 | Lyske |
| 2017/0091983 A1 | 3/2017 | Sebastian et al. |
| 2017/0103740 A1 | 4/2017 | Hwang et al. |
| 2017/0206875 A1 | 7/2017 | Hwang et al. |
| 2017/0330540 A1 | 11/2017 | Quattro et al. |
| 2018/0033416 A1 | 2/2018 | Neuhasuer et al. |
| 2018/0047372 A1 | 2/2018 | Scallie et al. |
| 2018/0049688 A1 | 2/2018 | Knight et al. |
| 2018/0053261 A1 | 2/2018 | Hershey |

OTHER PUBLICATIONS http://labs.tineye.com; Multicolor; Idee Inc.; copyright 2015; accessed Feb. 2, 2015, 1 page.

http://statisticbrain.com/attention-span-statistics/; Statistics Brain; Statistic Brain Research Institute; accessed Feb. 2, 2015; 4 pages.

Dukette et al.; "The Essential 20: Twenty Components of an Excellent Health Care Team"; RoseDog Books; 2009; p. 72-73.

Music Genome Project; http://en.wikipedia.org/wiki/Music.sub.--Genome.sub.--Project; accessed Apr. 15, 2015; 4 pages.

Ke et al.; "Computer Vision for Music Identification"; In Proceedings of Computer Vision and Pattern Recognition; 2005; vol. 1; p. 597-604.

Lalinsky; "How does Chromaprint work?"; https://oxygene.sk/2011/01/how-does-chromaprint-work; Jan. 18, 2011; accessed Apr. 15, 2015; 3 pages.

Gforce; http://www.soundspectrum.com; copyright 2015; accessed Apr. 15, 2015; 2 pages.

Harlan J. Brothers; "Intervallic Scaling in the Bach Cello Suites"; Fractals; vol. 17 Issue 4; Dec. 2009; p. 537-545.

Ke et al.; "Computer Vision for Music Identification"; IEEE Computer Vision and Pattern Recognition CVPR; Jun. 2005; 8 pages.

\* cited by examiner

Happy
3, 4, 4
3, 3, 5
3, 5, 5
3, 3, 4

Excited
2, 4, 4
3, 4, 3
3, 5, 3
2, 2, 4

Manic
5, 4, 3
4, 4, 2
4, 5, 3
4, 4, 3
4, 5, 2

Cautious
2, 4, 2
3, 4, 2
3, 3, 2
3, 3, 3
2, 3, 3

Peaceful
3, 2, 3
2, 2, 3
3, 2, 2
4, 2, 1
1, 1, 3

Sad
1, 2, 1
2, 3, 1
1, 1, 2
3, 5, 2
2, 2, 2

FIG. 14

Happy->0.805947 {3,4,4},PEREZ PRODO
Happy->0.805947 {3,4,4},BOMBAY
Happy->0.58095 {3,5,4},SANDY
Happy->0.894779 {3,3,5},GAKE NO UE
Happy->0.894779 {3,3,5},GHIBILI JAZZ
Happy->0.789556 {3,5,5},ANIMAL COLLECTIVE
Happy->0.789556 {3,5,5},FEAT MATIAS
Happy->0.727006 {3,3,4},COME AROUND
Happy->0.727006 {3,3,4},HOME PHILLIP
Happy->0.727006 {3,3,4},CONGRATULATOR
Happy->0.805947 {3,4,4},NUJABES Peaceful->0.82747 {3,2,3},WAKE ME UP
Peaceful->0.82747 {3,2,3},DIRTY BEACHES
Peaceful->0.897503 {2,1,3},SON GIANT
Peaceful->0.774811 {2,2,3},GRAVITY
Peaceful->0.774811 {2,2,3},DEW ON THE MOUTH
Peaceful->0.811017 {3,2,2},TABULA RASA
Peaceful->0.82471 {4,2,1},PORTISHEAD
Peaceful->0.677191 {4,2,3},USE SOMEBODY
Peaceful->0.810523 {1,1,3},GYM NOP DIE Excited->0.699998 {2,2,4},PARADIESSEITS
Excited->0.840394 {2,4,4},NINO ROTA
Excited->0.618906 {3,4,3},OH MAKER
Excited->0.618906 {3,4,3},TRACK 11
Excited->0.784713 {3,5,3},FORTUNE
Excited->0.784713 {3,5,3},WARRIORS Sad->0.918948 {1,2,1},OUROBOROUS IS BROKEN
Sad->0.918948 {1,2,1},NARCOSMICOMA
Sad->0.923338 {2,2,1},GASAFFELSTEIN 2,Sad}}}
Sad->0.814352 {2,3,1},VIRGINAL II
Sad->0.814352 {2,3,1},I GO TO SLEEP
Sad->0.817153 {1,1,2},ARVO PART
Sad->0.817153 {1,1,2},STILL LIGHT
Sad->0.745737 {3,5,2},FERAL LOVE
Sad->0.489348 {3,4,1},5_30
Sad->0.778667 {2,2,2},HOLD ON
Sad->0.778667 {2,2,2},STAY Manic->0.908082 {5,4,3},ANGSTBREAKER
Manic->0.807129 {4,4,2},GESAFFELSTEIN
Manic->0.807129 {4,4,2},COALITION
Manic->0.807129 {4,4,2},DEAD MAU5
Manic->0.814926 {4,5,3},KAP BAMBINO
Manic->0.814926 {4,5,3},SHE WILL
Manic->0.703821 {5,5,4},LIGHTING BOLT
Manic->0.784324 {4,4,3},HEADLESS
Manic->0.784324 {4,4,3},THA
Manic->0.784324 {4,4,3},SON THE FATHER
Manic->0.784324 {4,4,3},MOON TRANCE
Manic->0.840945 {4,5,2},GIRL ATTORNEY
Manic->0.840945 {4,5,2},MUSIC IS MATH Cautious->0.811334 {3,4,2},TETSUO
Cautious->0.811334 {3,4,2},SMELLS LIKE TEEN SPIRIT
Cautious->0.784681 {3,3,2},HAL
Cautious->0.784681 {3,3,2},WHO'S GOING TO SAVE MY SOUL
Cautious->0.784681 {3,3,2},DISNEY TOWN
Cautious->0.684964 {3,3,3},NUJABES 2
Cautious->0.684964 {3,3,3},MHH04
Cautious->0.684964 {3,3,3},SEA OF CLOUDS
Cautious->0.684964 {3,3,3},SARIA'S SONG
Cautious->0.755313 {2,3,2},HAVE A NICE LIFE
Cautious->0.730833{2,3,3},MICHAEL NYMAN
Cautious->0.730833{2,3,3},BUM RAPS AND LOVE TAPS
Cautious->0.730833 {2,3,3},AMANINAUSH
Cautious->0.730833{2,3,3},GOODBYE PORK PIE HAT
Cautious->0.866465 {2,4,2},BITCH PLEASE

FIG. 15

MUSIC SELECTION AND ORGANIZATION USING AUDIO FINGERPRINTS

CROSS-REFERENCE TO RELATED APPLICATIONS

This application is a continuation-in-part of U.S. patent application Ser. No. 14/671,973, filed Mar. 27, 2015, which is a continuation-in-part of U.S. patent application Ser. No. 14/603,324, filed Jan. 22, 2015; and is a continuation-in-part of U.S. patent application Ser. No. 14/603,325, filed Jan. 22, 2015; both of which are a continuation-in-part of U.S. patent application Ser. No. 13/828,656, filed Mar. 14, 2013, now U.S. Pat. No. 9,639,871, the entire contents of each of which are incorporated herein by reference.

U.S. patent application Ser. Nos. 14/603,324 and 14/603,325 both claim benefit under 35 U.S.C. § 119(e) of Provisional U.S. Patent Application No. 61/930,442, filed Jan. 22, 2014, and of Provisional U.S. Patent Application No. 61/930,444, filed Jan. 22, 2014, the entire contents of each of which are incorporated herein by reference.

U.S. patent application Ser. No. 14/671,973 also claims benefit under 35 U.S.C. § 119(e) of Provisional Application No. 61/971,490, filed Mar. 27, 2014, the entire contents of which are incorporated herein by reference.

This application is also a continuation-in-part of U.S. patent application Ser. No. 14/671,979, filed Mar. 27, 2015, the entire contents of which are incorporated herein by reference.

TECHNICAL FIELD

The present disclosure relates to content selection and organization systems.

BACKGROUND

Individual pieces of music are identified herein as "songs" for simplicity, regardless of whether such songs actually involve any form of human singing. Rather, a song is an individual piece of music that has a beginning and an end, regardless of its length, the type of music being played therein, whether it is instrumental, vocal or a combination of both, and regardless of whether it is part of a collection of songs, such as an album, or by itself, a single.

Traditional content selection systems, especially music selections systems, such as APPLE ITUNES, tend to rely on content types based on style, genre, content author(s), content performer(s), etc., for enabling users to browse through vast libraries of content and make selections to watch, listen, rent, buy, etc. For example, in such music selection systems, the music is often organized by the genre, style or type of music, i.e., jazz, classical, hip hop, rock and roll, electronic, etc., and within such genres, the music may be further classified by the artist, author, record label, era (i.e., 50's rock), etc.

Some music selection systems will also make recommendations for music based on user preferences and other factors. Pandora Media, Inc.'s PANDORA radio system, for example, allows users to pick music based on genre and artists, and will then recommend additional songs the user may be interested in listening to based on the user's own identification system. This identification system is derived from the Music Genome Project. While the details of the Music Genome Project do not appear to be publicly available, certain unverified information about it is available on-line. For example, Wikipedia states that the Music Genome Project uses over 450 different musical attributes, combined into larger groups called focus traits, to make these recommendations. There are alleged to be thousands of focus traits, including rhythm syncopation, key tonality, vocal harmonies, and displayed instrumental proficiency. See, http://en.wikipedia.org/wiki/Music_Genome_Project.

According to Wikipedia [[cite]], in accordance with the Music Genome Project, each song is represented by a vector (a list of attributes) containing up to 450 or more attributes or "genes," as noted above. Each gene corresponds to a characteristic of the music, for example, gender of lead vocalist, level of distortion on the electric guitar, type of background vocals, etc. Different genres of music will typically have different sets of genes, e.g., 150 genes for some types of music, 350 to 400 genes for other types, and as many as 450 genes for some forms of classical music. Each gene is assigned a number between 0 and 5, in half-integer increments. The assignment is performed by a human in a process that takes 20 to 30 minutes per song. Some percentage of the songs is further analyzed by other humans to ensure conformity. Distance functions are used to develop lists of songs related to a selected song based on the vector assigned to the selected song.

While the Music Genome Project represents an ambitious and detailed identification system, it suffers from many shortcomings as a result of its inherent complexity. The most significant of these deficiencies is that it often recommends songs, as implemented by PANDORA, as being similar to other songs, but listeners of those songs are not capable of identifying why those songs were determined to be similar. There may be very good reasons, among the hundreds of attributes being used to make determinations of similarities between the songs, but those similarities do not appear to relate to what most listeners hear or feel. Accordingly, a better, more simplistic solution is needed.

Human identification relies on human perception, which is a subjective system. Human perception is believed to be involved because songs identified by a particular mood and a particular color may or may not sound anything like other songs identified by the same mood and color. This tends to indicate human perception as a subjective error factor in identifying music in this manner.

SUMMARY

A content selection system and method for identifying and organizing moods in content using objectively measured scores for rhythm, texture and pitch (RTP) and clustered into six mood classifications based on an objective analysis of the measured scores. Digitized representations of the content may also be identified and organized based on the content's frequency data, three-dimensional shapes derived from the digitized representations, and colors derived from the frequency data. Each piece of content may be identified by at least a mood shape, but may also be identified by a mood color and/or a mood based on the clustered RTP scores and/or the digitized representation. In a further embodiment, the RTP-based mood classifications may be used in place of fingerprints and combined with color and shape. Users of the selection system may be able to view the moods identified in the different manners, or combinations of two or three mood identifying manners and select, customize and organize content based on the identified moods.

BRIEF DESCRIPTION OF THE DRAWINGS

Throughout the drawings, reference numbers may be re-used to indicate correspondence between referenced elements. The drawings are provided to illustrate examples described herein and are not intended to limit the scope of the disclosure.

FIG. 14 is an illustration of rhythm, texture and pitch (RTP) scores for a group of songs used to train the classifying and clustering system.

FIG. 15 is an illustration of classification scores for a larger group of songs objectively scored by RTP and clustered into one of six mood classes by the trained classifier.

DETAILED DESCRIPTION OF ILLUSTRATIVE EMBODIMENTS

Embodiments of the present disclosure are primarily directed to music selection and organization, but the principles described herein are equally applicable to other forms of content that involve sound, such as video. In particular, embodiments involve a content identification or classification system that objectively identifies music based on a three part classification model, an rhythm, texture and pitch (RTP) model, or a combination of both.

Figure 1:
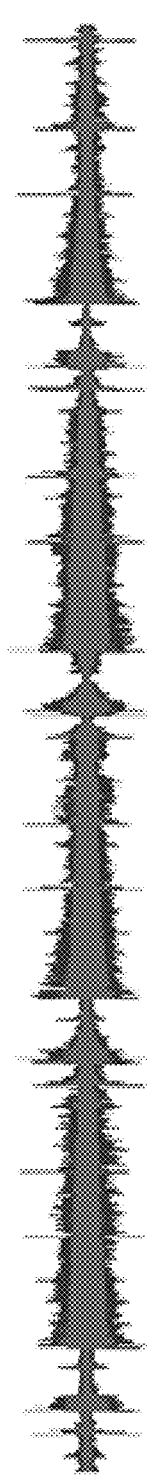
FIG. 1 illustrates an audio file represented as a waveform.

The three parts of the three part classification model include fingerprint, color and shape. The generation of the fingerprint will be described first. Music, and songs in particular, may be represented in a number of different ways that provide a visual representation of the music. As illustrated in FIG. 1, one of the simplest representations of music, such as a song, is a one dimensional (1-D) waveform that represents changes in the amplitude in the audio file over time.

While such a waveform can be somewhat distinctive of the song represented, the amount of information conveyed by the small distortions in the waveform is limited, making it difficult for someone viewing the waveform to extract much in the way of perceptual information. If that song evoked a mood in someone listening to the song, the 1-D waveform does little to represent the characteristics of the song that evoke that mood.

Figure 2:
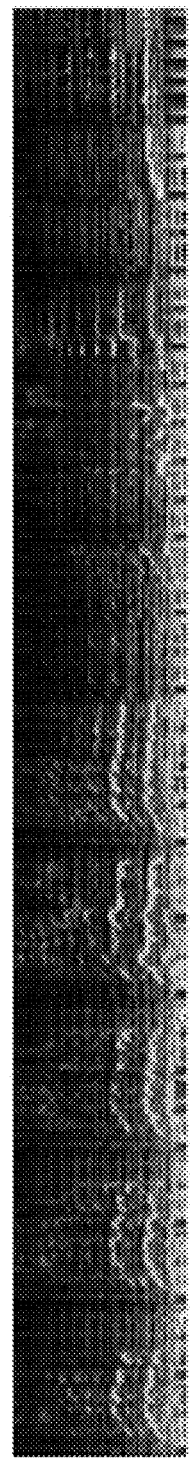
FIG. 2 illustrates an audio file represented as a spectrogram.

Accordingly, audio spectrograms based on a short-term Fourier transform, such as represented in FIG. 2, have been developed to provide a more complete and precise representation of a song.

The spectrogram is a two dimensional (2-D) representation of frequency over time, like a waveform, but is considered to provide a more accurate representation of the song because the spectrogram shows changes in intensity on specific frequencies, much like a musical score. The 2-D spectrogram shows some visual distinction based on signal differences due to different audio sources, such as different persons' voices and different types of instruments used to perform the song.

While the spectrogram visually represents some similarities and differences in the music, the time-domain signal representation makes the process of comparing spectrograms using correlation slow and inaccurate. One solution proposed for analyzing the characteristics of spectrogram images is disclosed by Y. Ke, D. Hoiem, and R. Sukthankar, *Computer Vision for Music Identification*, In Proceedings of Computer Vision and Pattern Recognition, 2005. In this paper, the authors propose determining these characteristics based on: "(a) differences of power in neighboring frequency bands at a particular time; (b) differences of power across time within a particular frequency band; (c) shifts in dominant frequency over time; (d) peaks of power across frequencies at a particular time; and (e) peaks of power across time within a particular frequency band." Different filters are used to isolate these characteristics from the audio data. If the audio data is formatted in a particular music format, such as MP3, .WAV, FLAC, etc., the compressed audio data would first be uncompressed before creating the spectrogram and applying the filters.

One solution for analyzing spectrograms of music in this fashion is the CHROMAPRINT audio fingerprint used by the ACOUSTID database. CHROMAPRINT converts input audio at a sampling rate of 11025 Hz and a frame size is 4096 (0.371 s) with ⅔ overlap. CHROMAPRINT then processes the converted data by transforming the frequencies into musical notes, represented by 12 bins, one for each note, called "chroma features". FIG. 1, FIG. 2, FIG. 3, FIG. 4, and FIG. 5 and the description herein regarding spectrograms, chromagrams, and audio fingerprints are based on https://oxygene.sk/2011/01/how-does-chromaprint-work/.

Figure 3:
FIG. 3 illustrates a visual representation of chroma features in an audio file.

After some filtering and normalization, an image like that illustrated in FIG. 3 may be generated.

While the audio representation, or chromagram, of FIG. 3 is robust and may be used for other purposes herein, it does not lend itself well to comparative analysis and needs to be further compacted to be useful in that regard, which is where the characteristic filters noted above may come into play. First, the image of FIG. 3 may be scanned from left to right, one pixel at a time, in grayscale, to create a large number of subimages. Then, the characteristic filters may be applied to the subimages to capture intensity differences over time in the musical notes represented by the subimages. Each filter may calculate the sum of specific areas of the subimages, compare the sums, and arrange the areas in one of six ways, as illustrated in FIG. 4.

Figure 4:
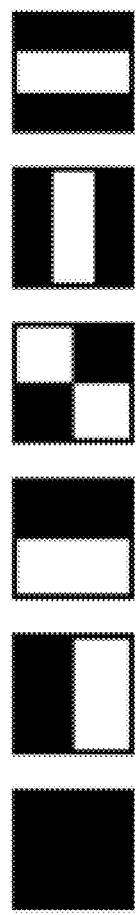
FIG. 4 illustrates subimage filters for filtering the visual representation of FIG. 3 in order to generate an audio fingerprint.
Figure 5:
FIG. 5 illustrates an audio fingerprint.

The arrangement of filter images from FIG. 4 may be placed over the subimages, adjusted in size (as long as the filter image fits within the pixel size of the subimage), and the resulting black and white areas may be processed to derive a single real number representing the arrangement. Every filter may have one or more coefficients associated with it that specify the rules for quantizing the real number so the final result is an integer between 0 and 3.

CHROMAPRINT uses 16 filters that can each produce an integer that can be encoded into 2 bits. When these are combined, the result is a 32-bit integer. This same process may be repeated for every subimage generated from the scanned image, resulting in an audio fingerprint, such as that illustrated in FIG. 5, which can be used to isolate and identify the frequency characteristics of a song that make that song feel a particular way to a listener, i.e., identifies the particular mood or moods of the song.

Audio or acoustic fingerprints may be used to identify audio samples, such as songs, melodies, tunes, advertisements and sound effects. This may enable users, for example, to identify the name of a song, the artist(s) that recorded the song, etc., which can then be used to monitor copyright compliance, licensing compliance, monetization schemes, etc.

The present disclosure proposes a number of additional novel uses for audio fingerprints and other components used to generate the fingerprints, including the spectrogram and the chromagram, which may be used to objectively identify texture, pitch and the moods in songs or other content, respectively. When a listener feels a particular emotion as a result of listening to a song (except for any personal connection to memories or experiences that the listener may also have), the listener is typically reacting to some inherent quality that can be identified within the frequencies or other characteristics of the song. Since all aspects of a song may be represented in its frequencies and aspects of those frequencies, and those frequencies are used to generate an audio fingerprint, the mood of that song may therefore also be represented in that audio fingerprint. By comparing known similarities between audio fingerprints for songs having the same mood, it may be possible to identify the mood of a song by simply analyzing the audio fingerprint.

Since some songs represent multiple moods or more or less of a mood than other songs, the degree of one or more moods represented by a song may be represented by similarity percentages. For example, if a song is 40% aggressive, 40% sad, and 20% neutral, the mood identifiers may also be associated with those similarity percentages.

While the use of audio fingerprints to identify moods in a wide range of songs is a significant improvement over the existing technique of relying on humans to listen to songs in order to identify the mood(s) conveyed by the songs, there is still a causality dilemma. In order to get a classifying/clustering machine to use audio fingerprints to identify different moods represented in songs, it is first necessary to train the machine with audio fingerprints that represent different moods in the songs, which requires humans to listen to some set of songs to identify the moods in that set so that set can be used to train the machine. As a result, if the machine is not well trained, then the audio fingerprint based identification may not be accurate. This human element also reintroduces some of the possible subjective error that exists from reliance on human-based mood identification.

The present disclosure also addresses these problems by using at least three different mood identification techniques to identify each song. While a human element may be used to get the process started, using multiple mood identification techniques, such as audio fingerprinting, makes it possible to check each mood identification technique against at least two other different mood identification techniques, which results in better mood identification accuracy.

One additional mood identification technique, as previously noted, is the use of color. Color is more traditionally thought of in the context of timbre, which is the term commonly used to describe all of the aspects of a musical sound that have nothing to do with the sound's pitch, loudness or length. For example, two different musical instruments playing the same note, at the same loudness and for the same length of time may still be distinguished from one another because each of the instruments is generating a complex sound wave containing multiple different frequencies. Even small differences between these frequencies cause the instruments to sound differently and this difference is often called the "tone color" or "musical color" of the note. Words commonly used to identify musical color include clear, reedy, brassy, harsh, warm, resonant, dark, bright, etc., which are not what humans tend to think of as visual colors.

Nevertheless, a similar technique may be used to assign visual colors to music. The human eye has three kinds of cone cells that sense light with spectral sensitivity peaks in long, middle and middle wavelengths, noted as L, M and S. Visual colors similarly correspond to these wavelengths, with blue in the short wavelength, green in the middle wavelength, and red spanning between the middle wavelength and the long wavelength. The three LMS parameters can be represented in three-dimensional space, called "LMS color space" to quantify human color vision. LMS color space maps a range of physically produced colors to object descriptions of color as registered in the eye, which are called "tristimulus values." The tristimulus values describe the way three primary colors can be mixed together to create a given visual color. The same concept may be applied to music by analogy. In this context, musical tristimulus measures the mixture of harmonics in a given sound, grouped into three sections. The first tristimulus may measure the relative weight of the first harmonic frequency; the second tristimulus may measure the relative weight of the 2nd, 3rd, and 4th harmonics taken together; and the third tristimulus may measure the relative weight of all the remaining harmonics. Analyzing musical tristimulus values in a song may make it possible to assign visual color values to a song.

Since the musical tristimulus values correspond to the frequencies represented in a song, and (as noted above) the frequencies can be used to identify moods in that song, it follows that the visual colors identified in that song can be used to identify the mood(s) of that song. However, because songs consist of multiple frequencies, simple visual color representations of songs tend to end up looking like mixed up rainbows, with the entire visual color spectrum being represented at once. To address this issue, each visual color representation can be further analyzed to identify predominant visual colors and to delete visual colors that are less dominant, resulting in a smaller (more representative) set of visual colors, such as six colors, representing a mood of each song.

In a similar manner, melody, rhythm and harmony may also be mapped to colors. For example, sound without melody, harmony, or rhythm is known as white noise. A song with lots of rhythm, harmony and melody may be thought of as being black. Sounds that have equal attributes of melody, rhythm and harmony, may therefore be thought of as being gray. Harmonious tones without melody or rhythm may be mapped to a specific color, such as yellow. Music that includes melody and harmony, but no driving rhythm, may be considered green. Music with lots of melody, but little rhythm or harmony, may be considered cyan. A simple melody with a hard driving rhythm may be blue. Music with lots of rhythm, some melody, and some harmony, may be purple. Music with lots of rhythm and some harmony, but little melody, may be red. The above color association is just an example and other color associations may readily be used. The point is that combining this form of music colorization with the musical tristimulus colorization technique may result in songs being identified with more predictable color identifiers.

Figure 6:
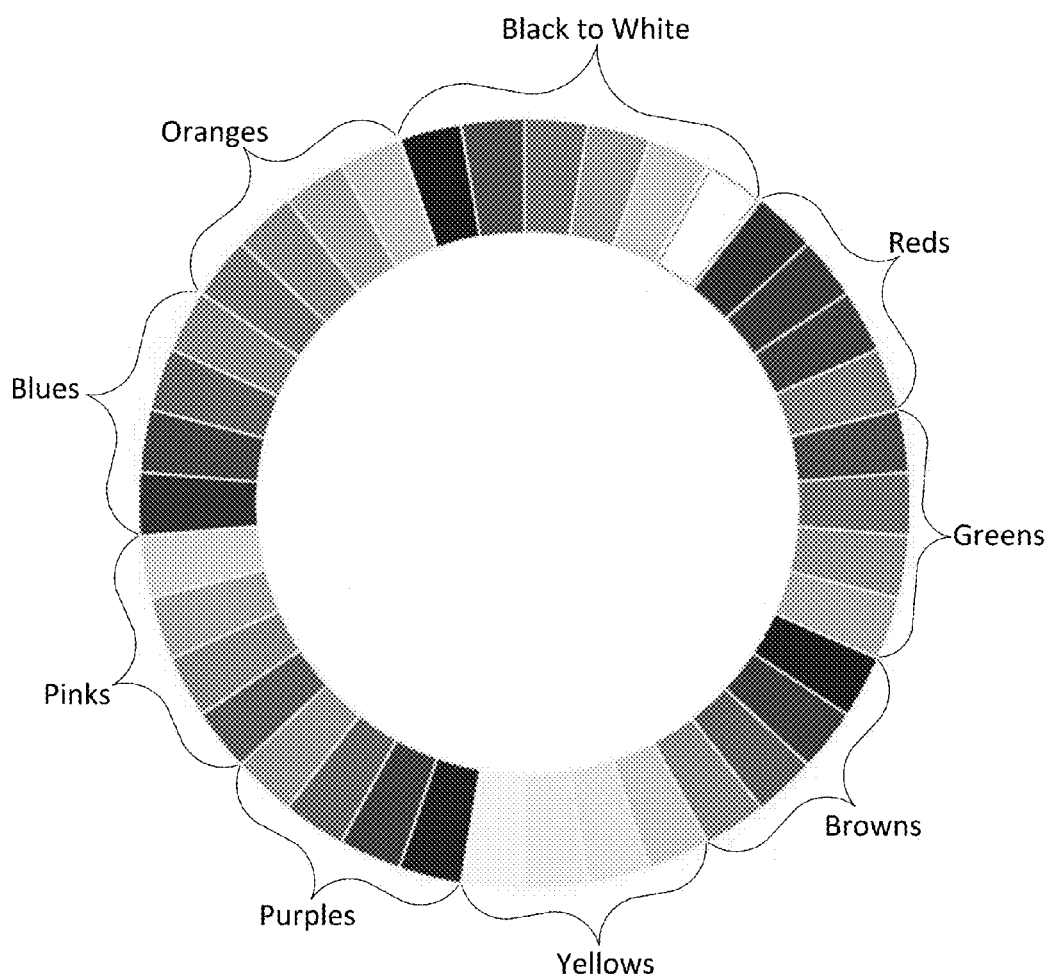
FIG. 6 illustrates a color wheel associated with a study about how people pick different colors to describe different moods.
Figure 7:
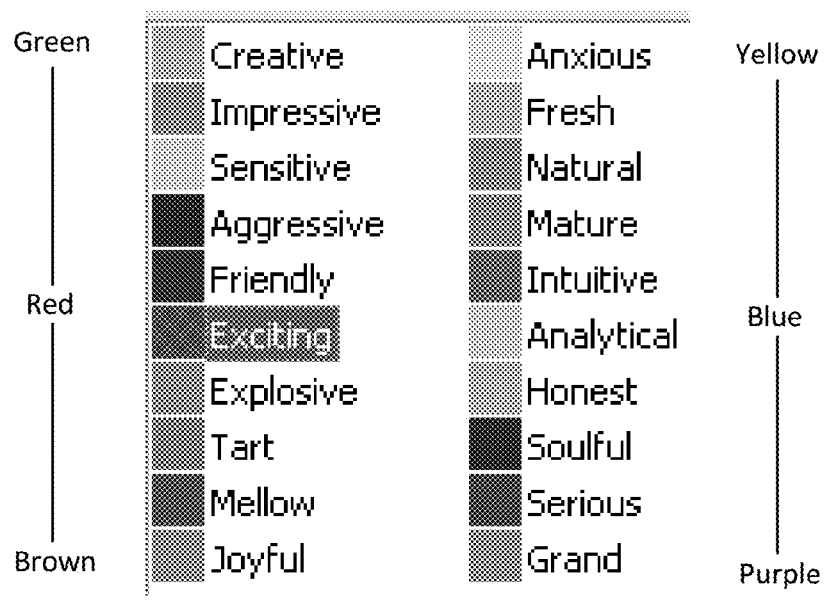
FIG. 7 illustrates colors associated with moods based on a type of mood ring.

According to a research study published in the journal BMC Medical Research Methodology (Feb. 2, 2010), people on average tend to pick different colors to describe different moods. FIG. 6 illustrates a simplified version of a color wheel based on that study. While the study was more focused on the colors that people picked based on their moods associated with their health, i.e., healthy, anxious or depressed, many other examples exist that associate colors with human moods that are unassociated with health per se, such as happy, sad, etc. FIG. 7 illustrates one example of colors associated with moods.

Using any appropriate color/mood association chart, it is thus possible to identify the mood(s) represented by a song for the color identifiers for that song. The mood(s) identified for a song using the color technique can then be compared to the mood(s) identified for the same song using audio fingerprints or other mood identifying techniques. There may be a correlation between the two, but now always, which illustrates that at least one of the techniques may be less accurate, which is why at least one additional mood identification technique may be helpful in order to triangulate the mood identifiers for a song. For example, it may be difficult to accurately identify the location of an object based on two reference points (signals between a mobile device and two cell towers, for example), but when three reference points are used, the object's location can usually be fairly accurately identified, absent any signal interference, or the utilization of techniques for eliminating or accommodating for such interference. The same principles may be applied with moods. With two mood identifiers for a song, it may be possible to identify the mood of the song, but that identification may not always be accurate. When a third mood identifier is added, however, the accuracy may increase significantly. Additional mood identifiers may likewise be added to further increase accuracy, up to a certain point, where the addition of further mood identifiers makes no significant statistical difference.

A third mood identification technique for music includes shape. One type of system that generates shapes associated with songs are software programs known as "visualizers," such as VSXU, MILKDROP, GFORCE and multiple different plugins for APPLE's ITUNES. Such visualizers tend to use the same audio frequency data utilized to generate audio fingerprints, so the resulting images may be similarly useful in terms of identify moods. However, despite the fact that the same frequency data may be used as an input to an audio fingerprint system and a visualizer system, some visualizers also use loudness as an input, which may cause the visualizer to identify different moods than the audio fingerprint system using the same frequency data, where amplitude may not be used to generate the audio fingerprint. In addition, each visualizer may analyze the frequency data differently and may therefore identify different moods.

Since it is desirable to have a fairly high level of mood identification correlation between the different systems used, it may be problematic if the visualizer identifies different moods than the other mood identification systems. Accordingly, mood identification systems may be chosen based on the level of correlation between the moods each system identifies.

Figure 8:
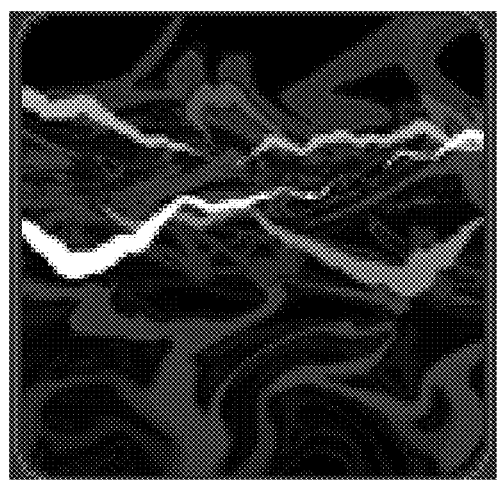
FIG. 8 is an illustration of a screenshot capture of images generated by an audio visualizer.

While a visualizer may be used as a mood identification system, some visualizers are designed to create different visualizations for each song every time the program is run, so some visualizers may not be well suited for mood identification for this reason. In addition, some visualizers produce very complex imagery associated with songs. For example, one of the simpler screenshots generated by the GFORCE visualizer, and made available on the SoundSpectrum, Inc. website, http://www.soundspectrum.com/, is illustrated in black and white in FIG. 8. The original image is a mixture of black, white and purple colors. Other images generated by the GFORCE visualizer are significantly more complicated.

Similarly complicated and unique shapes may be generated from songs in much the same way that images may be generated from fractals. For example, in HARLAN J. BROTHERS, INTERVALLIC SCALING IN THE BACH CELLO SUITES, Fractals 17:04, 537-545, Online publication date: 1 Dec. 2009, it was noted that the cello suites of Johann Sebastian Bach exhibit several types of power-law scaling, which can be considered fractal in nature. Such fractals are based on melodic interval and its derivative, melodic moment, as well as a pitch-related analysis. One issue with complicated shapes representing moods, such as those images generated by the GFORCE visualizer or a fractal based system, although they may be used for mood identification, is that the images may be too complicated for many users to reliably identify a mood based on the generated images.

Accordingly, the present disclosure describes a simpler type of imagery that may be utilized to identify the moods in songs, and which may be combined with the color mood identification system described above. The present disclosure uses audio fingerprints, instead of the frequency data used to generate the audio fingerprints (although the frequency data may be used instead of the fingerprint), to generate simplistic, three-dimensional geometric shapes for each song. By using the fingerprint itself, although analyzed in a different way, a correlation between the moods identified with the fingerprint and the shapes may be assured.

Figure 9:
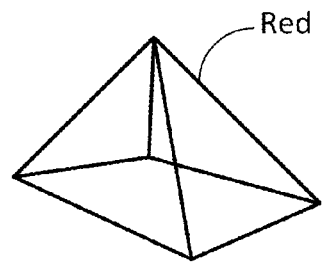
FIG. 9 is an illustration of a three-dimensional shape identifying an aggressive mood.
Figure 10:
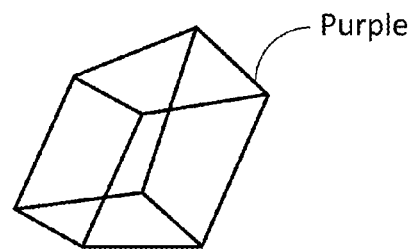
FIG. 10 is an illustration of a three-dimensional shape identifying a sad mood.
Figure 11:
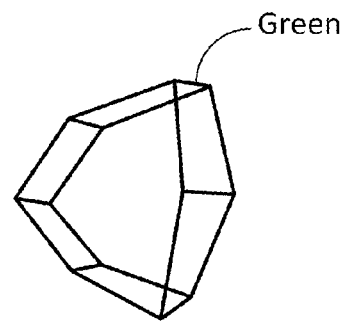
FIG. 11 is an illustration of a three-dimensional shape identifying a neutral mood.

As previously, described, an audio fingerprint may be used to generate a static visual representation of a song, but like visualizer images and fractal images, the visual representation may be too complicated for humans to easily identify similarities between different fingerprints. By converting the audio fingerprint into a simple geometric representation of the complex data, it is easier for humans to easily recognize and differentiate between the visually represented songs. FIGS. 9, 10 and 11 illustrate three different examples of shapes generated from audio fingerprints that identify the mood of a song. The shapes are also colored in accordance with the mood that has been identified. Song 1 of FIG. 9 is visualized as a rather sharp angled square pyramid, colored bright red; the shape and color of which may identify a song with an aggressive mood. Song 2 of FIG. 10 is visualized as a rather 90 degree angled parallelpiped, colored purple; the shape and color of which may identify a song with a sad mood. Song 3 of FIG. 11 is hexagonal three dimensional shape, colored green; the shape and color of which may identify a song with a neutral mood.

The details that make up the geometric shape (shape, angles, number of sides, length of lines) are determined by the unique data contained within the audio fingerprints. Since each of the above songs are distinctly different from one another, they generate distinctly different shapes. Songs with more aggressive moods tend to generate shapes with sharper angles. Songs with sadder or more mellow moods tend to generate shapes with angles that are close to 90 degrees. Songs with more ambiguous moods tend to generate shapes with more ambiguous shapes.

At the same time, there may also be degrees of similarities between songs that are based on the level of mood represented. For example, in FIG. 12A, Song A, which is 95% aggressive and bright red, may be distinguishable from Song B of FIG. 12B, which is 70% aggressive but still also bright red. Both songs may represent aggressive moods and have similar shapes, but the more aggressive song may have longer line lengths. Alternatively, the song that includes more of the identified mood may have sharper angles. Other shapes may also be used to identify different moods than the shapes shown herein. For example, two dimensional shapes may be used or other three dimensional shapes may be used, such as any homomorphic shape.

Figure 12A:
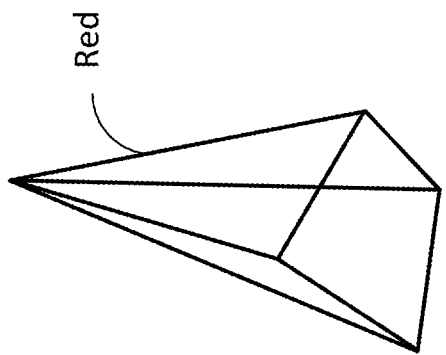
FIGS. 12A and 12B are illustrating three-dimensional shapes identifying different levels of an aggressive mood.
Figure 12B:
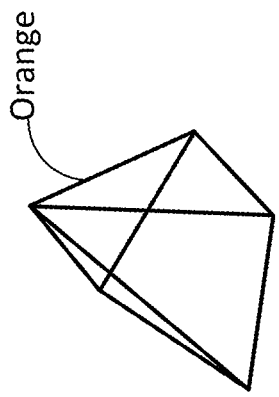

With reference back to FIGS. 12A and 12B, the difference in the two shapes may be due to a variety of factors, such as the presence of vocals, which may lend heavily to the aggressive mood identification. The percentage of mood represented above may represent how far a song leans towards a particular identification. Without the vocals, a song may be less aggressive. As the aggressive percentage for songs is lowered, the color of the mood may also begin to shift slightly away from bright red to more of an orange-red color (i.e., as the percentage lowers, the color may shift hue more towards whatever mood was appropriate). Also, while the square base of the geometric shape illustrated in FIGS. 12A and 12B may be the same in both songs, different base shapes may also be used. As illustrated in FIGS. 12A and 12B, the top and mid-level areas of the shape, representing the top and mid-range frequencies of the song, may change significantly. Nevertheless, based on the two shapes represented in FIGS. 12A and 12B, it may be possible to note that the two songs are similar and have similar moods without hearing either of the actual songs.

Figure 13:
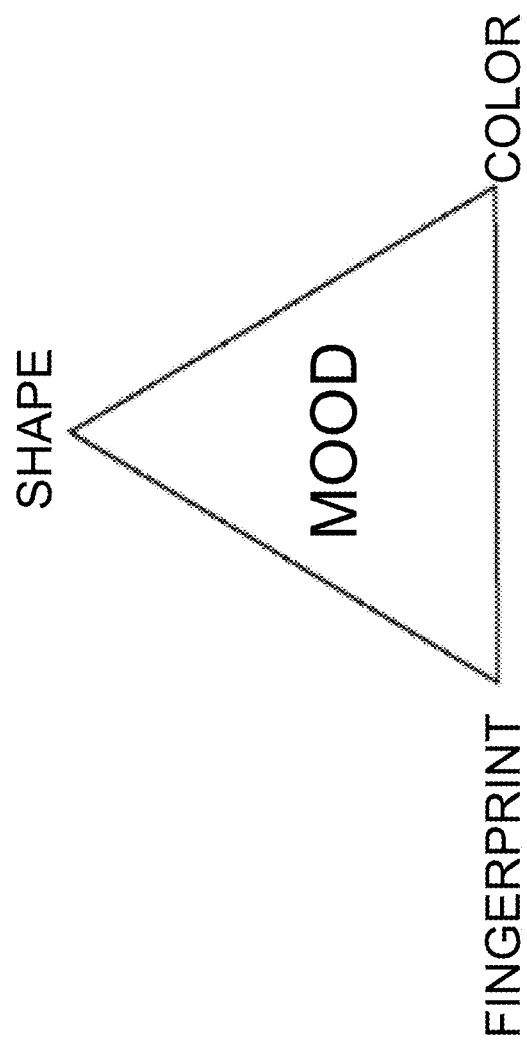
FIG. 13 is an illustration of how moods in content are identified, in accordance with an embodiment, through a three part classification model involving fingerprint, shape and color.

In view of the above, it may be possible to identify the mood or moods in a particular song in at least three different ways, as illustrated in FIG. 13, by shape, fingerprint and color.

With these three different types of classifications, it may be possible to identify in any type of music or other content corresponding commonalties. The fingerprint, color and shape may define where a song or other type of content fits within any type of content selection system, which may make it easier for any user of the selection system to select content they desire.

An alternative to using audio fingerprints to objectively identify moods in songs is to use rhythm, texture and pitch to objectively identify moods in songs. And, as further described below, it may likewise be possible to objectively determine scores for rhythm, texture and pitch for purposes of using those scores to determine the mood classification/mood class/mood for each song. FIG. 14 illustrates a set of RTP scores, organized by mood among a number of moods, that may be used to train a machine learning system, such as a multiclass Support Vector Machine (SVM) or other appropriate classifier. As illustrated, RTP is represented by a vector having only three attributes scored with a whole number integer between 1 and 5, although an alternative scoring system may be used. For example, vectors for one of the moods, Happy, are (3, 4, 4) and (3, 3, 5) and (3, 5, 5) and (3, 3, 4), indicating that the rhythm scores were all 3's, the texture scores ranged between 3 and 5, and the pitch scores ranged between 4 and 5. Other moods trained in this example include Excited, Manic, Cautious, Peaceful and Sad. While only six moods were trained for this example fewer or more moods may have been used. When fewer moods are used, the functional margin (the largest distance to the nearest training data point of any class) may be larger. Reasonable functional margins have been achieved with six moods that may not be as possible if the total number of moods is increased.

A SVM trained with the RTP scores for the moods listed in FIG. 14 was then used to classify a greater number of songs. As illustrated in FIG. 15, the 65 songs listed therein were classified in the mood classes they were expected to be classified in with one hundred percent (100%) success. While the vectors for the 65 songs do not represent the totality of all possible RTP scores, the functional margin within most of the moods was quite high, as indicated by SVM probability percentages in the 70 to 90+ percentile range for all but 10 of the 65 songs, and 8 of those 10 in the 60 percentile range. A classification system trained in this manner may efficiently classify a large number of songs into specified moods classes. Once in those mood classes, the songs may be listened to by a user or further customization may be performed to generate specific groups of songs that the user wants to hear.

Figure 16:
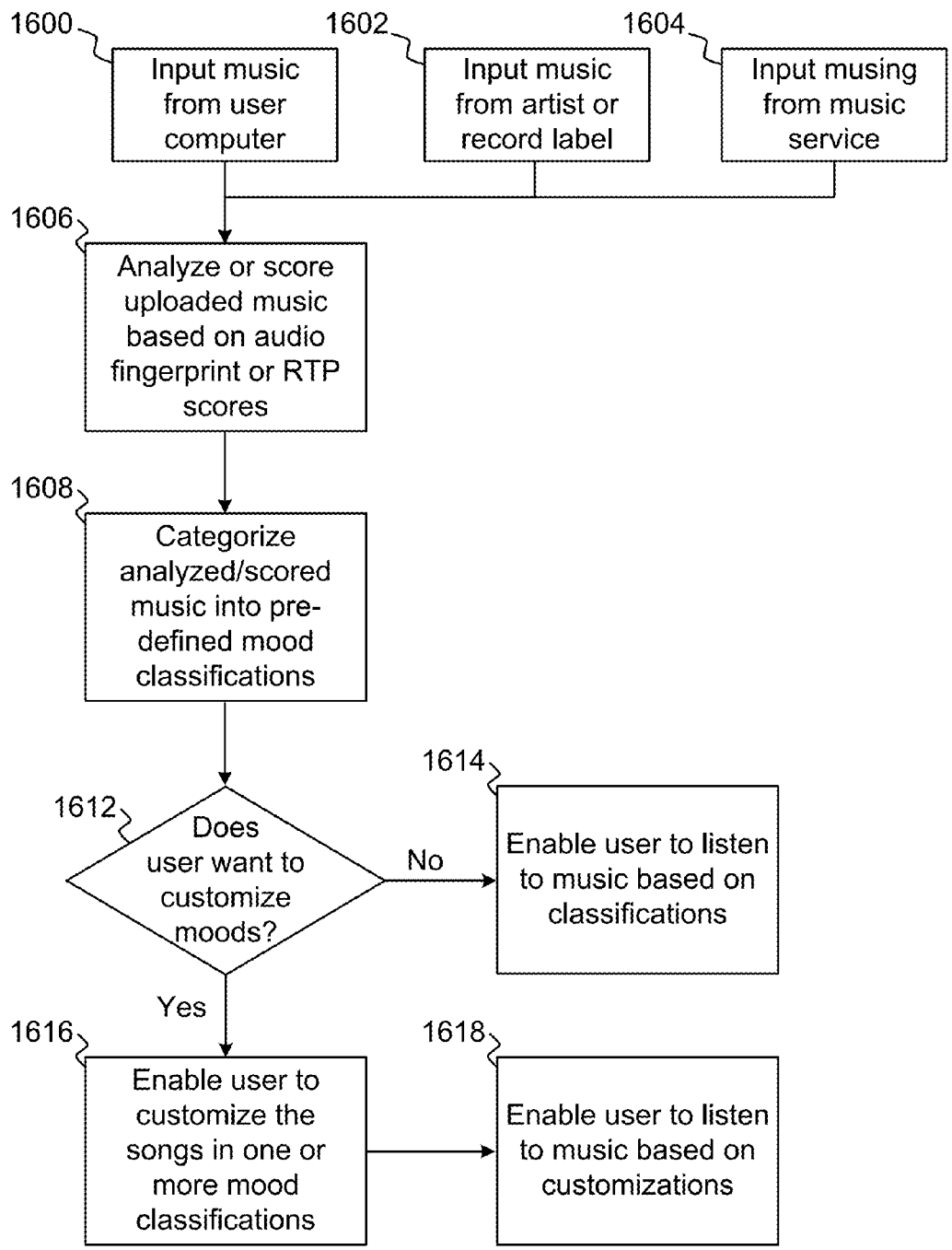
FIG. 16 is a flow chart illustrating the objective scoring of input songs based on RTP, the objective classifying of the scores in order to cluster the songs into different mood classes, various options that may be performed by a user to customize the mood classes, and the subsequent utilization of the songs by the users as organized in accordance with this process.

In an embodiment, as illustrated in FIG. 16, songs could be input by a user in a variety of ways for mood classification as noted above, either using audio fingerprints or RTP scoring. For example, the characteristics of a digitized representation, such as the audio fingerprint, could be determined on an end user device, based on one or more songs in a library or file stored on the end user device. The characteristics may be limited to just those characteristics necessary to objectively determine the RTP for the songs. Those necessary characteristics may then be sent from an end user device to another computer, such as a server, that includes the analytical software necessary to determine the moods of the songs from the necessary characteristics. This embodiment removes the need for the end user device to send copies of songs to the other computers, thereby avoiding any copyright issues that might result for generating or distributing such copies.

In an embodiment, the characteristics of the digital representation of songs may be analyzed to determine their moods as described above before songs are first published by artists or record labels representing the artists. Alternatively, the artists or recording labels could input the songs for analysis, step 1602. If the moods of the songs are determined before being published, the metadata for each song could include the mood(s) for in the same manner as genre, artist, title, etc.

In the same manner songs may be input by a music services, step 1604, such as ITUNES, SPOTIFY, PANDORA and the like. Once input, the songs may be analyzed to determine either the audio fingerprints or the RTP scores, step 1606, for the songs. Once the songs have been analyzed or scored, the songs may be placed into different mood classifications as noted above, step 1608, and as appropriate for the analysis/score of the songs. Once the moods of songs are determined, the music service could then include the mood of each song with the streamed data. In an embodiment, the music service analyzes the songs itself In the manner described above and provides mood information with the streamed songs so users can select songs based on mood as well as other data.

In an embodiment, users may be able to customize moods after the moods have been first determined, step 1612. As the moods of the songs are objectively determined, but mood is inherently a subjective determination of the listener, not every objective mood determination will fit a particular listener's subject mood. Hence, it may be desirable to allow listeners to change moods or groups songs into their own categories. If a listener/user does not want to customize any aspect of a mood for a song, then the user may be enabled to just listen to the songs as classified, step 1614. Alternatively, the listener/user wants to customize the moods or categorize the songs based on moods, they may do so, step 1616. In an embodiment, the user may want to categorize songs with the same mood or perhaps different moods within a single category that they name themselves, such as "Sunday Listening," which includes a grouping of songs with different moods that a user likes to listen to on Sundays.

User preferences may include negative or positive preferences in a wide variety of categories. For example, a user could indicate a desire not to listen to any country music or pop songs within a particular mood, or to only listen to songs published after 1979. Preference may include genre, artist, bands, years of publication, etc. Once a user has customized the mood classes based on their preferences in step 1616, the user may then be enabled to listen to the music based on the customizations, step 1618. It should be noted, that just because one or more songs were excluded from a particular mood class by a customization, that does not change the mood class associated with those one or more songs. A user may create a customized play list of songs on one occasion based on particular preferences and then create a different customized play list of songs based on other preferences on another occasion. Thus, the songs remain classified as they are and remain in the mood classes to which they are assigned regardless of the user's customizations, which apply only to the customized lists created in step 1618.

As noted above, in addition to objectively analyzing or scoring songs in order to classify them by mood, it may also be possible to objectively analyze songs in order to generate RTP scores for the songs. For example, the chromagrams generated as part of the process of creating audio fingerprints may also be used to objectively determine the pitch for songs for which chromagrams have been generated. The chromagram is analogous to a helix that circles around from bottom to top like a corkscrew. The musical scale goes around the helix, repeating keys each time it goes around, but each time at a higher octave. Just as there are 12 octaves in the scale, there are 12 vectors in the chromagram. If one were to attempt to scale the 12 vectors of the chromagram for each song across the 88 keys to a piano, for example, it may be very difficult to do, but that is not actually necessary.

The same SVM system described above can be used for purposes of objectively determining pitch in songs by determining a number of combinations of chromagram vectors among all possible combinations of chromagram vectors that correspond to certain pitch scores and then training a multiclass SVM with that number of combinations of chromagram vectors. Once the SVM has been trained, the SVM may then be used to determine which pitch score (such as an integer between 1 and 5) corresponds to every single possible combination of chromagram vectors, and once a set of all of the predetermined combinations of chromagram vectors have been mapped to different pitch scores, future pitch scores may then be determined by comparing a combination of chromagram vectors against the set of predetermined combinations of chromagram vectors and assigning the pitch score to the music based on a match between the combination of chromagram vectors to one of the predetermined combinations of chromagram vectors among the set of predetermined combinations of chromagram vectors.

Training the SVM as noted above and testing the SVM based on a 15 song subset of the 65 songs for which chromagrams have been produced generated correct results and acceptable functional margins for twelve of the fifteen songs, compared to the human generated scores for pitch, which are noted after each song below:

angstbreaker 3,{3→0.786129}
animal collective 5,{5→0.659113,2→0.104746, 4→0.0921675,3→0.0778412,1→0.0661322}
arvo part 2,{3→0.477773,2→0.427112}
dirty beaches 3,{3→0.916016}
gesaffelstein_2 1,{3→0.380862,4→0.377543, 1→0.152978,2→0.0736804}
gesaffelstein 2,{2→0.688006,4→0.157389, 5→0.0716296}
ghibli jazz 5,{3→0.517388,5→0.253165,2→0.120315, 4→0.0659154}
have a nice life 2,{2→0.786667,1→0.0860961}
kap bambino 3,{3→0.82835}
lightning bolt 4,{4→0.784288}
michael nyman 3,{3→0.880959}
nujabes2 3,{3→0.769765,4→0.0944392,1→0.0901176}
nujabes 4,{4→0.5828,3→0.186997,1→0.115422, 2→0.0681724}
perez prado 4,{4→0.599685,3→0.256931, 2→0.0731682}
portishead 1,{1→0.573343,3→0.145585,2→0.113073, 4→0.111257}

Additional fine tuning and training will likely yield better results.

Texture generally relates to the singular or multiple melodies in a song and whether or not those melodies are accompanied by chords. Texture can also be representative of the density of frequencies in a song over time. In order to compute the chromagram used to generate the audio fingerprints and the objective pitch scores noted above, it is first necessary to generate the spectrogram for each song. The spectrogram is a visual representation of the spectrum of frequencies in each song as the songs plays. As a result, the spectrogram for a song can be used to represent the texture for a song. One manner of representing the texture and scaling the score from 1 to 5 is to average the frequency densities and separate those out by fifths. If the average frequency density for a song is in the first quintile, the texture score would be a 1 and if the average frequency density for a song is in the fifth quintile, the texture score would be a 5.

Rhythm can also be denoted by a long list of complicated factors, but the primary components of rhythm are Beats Per Minute (BPM) and time signature. A number of currently available tools exist to measure BPM in songs as well as time signatures, which are an indication of how many beats are contained in each bar and which note value is to be given one beat. In a manner similar to that described above, the raw BPM and time signature data generated by such tools can then be used to derive averages for both BPM and time signatures in the songs that may then be mapped to a 1-5 score. For example, a song with a consistently average BPM throughout the song and neither too fast or too slow, along with an even time signature, such as 4/4 time, may be scored a 3 for rhythm. A song with a higher average BPM, but which is inconsistent in places, or a moderate average BPM, but either a changing time signature or other variation, such as 5/4 time, may be scored a 4 for rhythm. Songs with slower BPMs and even time signatures may be scored a 2 for rhythm.

With regard to RTP scores and application of the SVM, once the SVM has scored every possible combination of RTP scores there will be no need to classify a song with the SVM once the song has been scored. For example, if a song has an RTP score of 3, 3, 5, its mood classification will be Happy because previously RTP scored songs with the same vector have been classified as Happy. Since every digital file, including any digitized music file, has a computable MD5 hash associated with it, where the MD5 hash is a cryptographic hash function producing a 128-bit (16-byte) hash value, typically expressed in text format as a 32 digit hexadecimal number, the MD5 hash can serve as a unique identifier for each song. Once a song has been scored, the MD5 hash can be computed and associated with the song. Thereafter, without rescoring a song, the MD5 hash can first be computed to see if the song has already been scored, and if so, the existing score can be used for that song, thereby greatly simplifying the scoring process for known songs. If the song has not been scored, it will be scored and the MD5 hash will be associated with that score. Other unique identifications associated with different types of music formats may be used in a similar manner.

Figure 17:
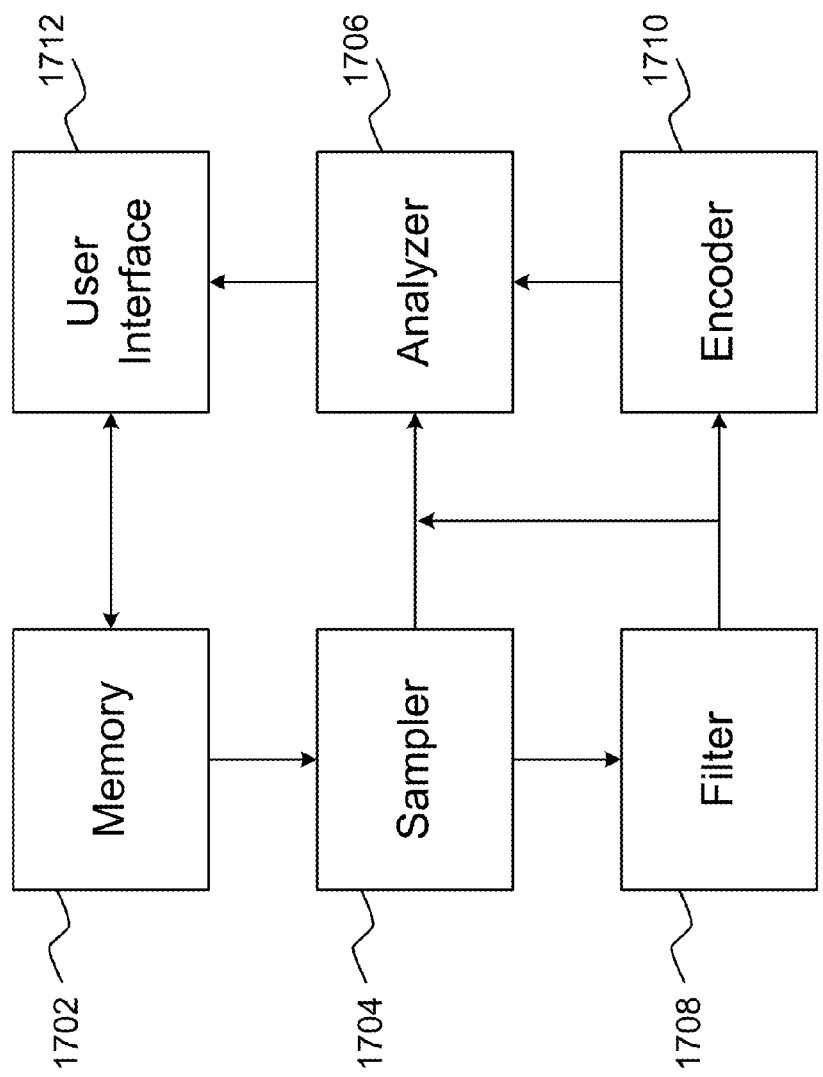
FIG. 17 is a block diagram illustrating a computing system for implementing the identification, selection, customization and organization techniques described above.

A block diagram of a music selection and organization system based on the above disclosure is illustrated in FIG. 17. A memory 1702 stores a plurality of content. The data, such as frequency data, in that content is then read and/or sampled by the sampler 1704 on a periodic basis until all of the content in the memory 1702 has been sampled, which may then be updated from time to time with new content sampled by the sampler 1704 as the new content is added. After the content is read and/or sampled, usually on a piece by piece basis, the sampler, or a device connected to the sampler, such as the analyzer 1706, generates a static representation of the piece based on the sampled frequency data, which may be a static visual representation, such as a spectrogram. The static visual representation may then be filtered by the filter 1708 to capture intensity differences represented in the static visual representation and to generate a filtered representation of the content. The analyzer 1706 may also be used by the filter 1708 to create the filtered representation, such as a chromagram. An encoder 1710 may then encode the filtered representation and create digitized representations of the content based on the encoded filtered representation, such as an audio fingerprint. The analyzer 1706 may also identify characteristics within the digitized representations that correspond to moods in the content and generate three-dimensional shapes that correspond to the moods. The analyzer 1706 may also analyze the data for other purposes, such as to determine the MD5 hash, analyze the spectrogram to determine aspects of rhythm and texture, and analyze the chromagram to determine aspects of pitch, all in order to determine RTP scores for mood classification. The mood identifications corresponding to the content is then fed to the user interface. Other data read from the input files, such as metadata (i.e., artist, title, year, genre and other data), may also be fed to the user interface. Users are then able to view the three-dimensional shapes to select content based on the moods represented by the three-dimensional shapes.

The three-dimensional shapes may be wire frames or solids. Each three-dimensional shape may include at least one angle and one side, where the degree of the angle and the length of the side identify a percentage of a mood identified in the content. The three-dimensional shapes may also include one or more colors that represent moods in the corresponding content. The color may be determined by creating a color representation of the content based on the frequency data sampled from the content. Predominant colors identified in the color representations are kept and less predominant colors in the color representation are deleted so as to generate one or more colors representing the mood(s) in the content. The color representation may be based on tristimulus values. The color representation may also be based on combinations of melodies, harmonies and rhythms in the content and/or RTP data. The moods may also be derived by the analyzer directly from the digitized representations. The content may be music or video that includes music.

In an embodiment, a user of the selection and organization system may also load a song or other content of their choice into the selection and organization system so as to generate a color, shape, RTP score, or fingerprint representation, and then search for similarly identified content. Extending the same idea further from that, the user may randomly generate a visual representation without specific content in mind, and find content based on fingerprints, RTP scores, colors or shapes aesthetically pleasing to the user.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another, or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. The example systems and components described herein may be configured differently than described. For example, elements may be added to, removed from, or rearranged compared to the disclosed examples.

While certain example or illustrative examples have been described, these examples have been presented by way of example only, and are not intended to limit the scope of the subject matter disclosed herein. Indeed, the novel methods and systems described herein may be embodied in a variety of other forms. The accompanying claims and their equivalents are intended to cover such forms or modifications as would fall within the scope and spirit of certain of the subject matter disclosed herein.

What is claimed:

1. A method for identifying mood in content, comprising:
generating a static visual representation of an item of content based on frequency data sampled from the item of content;
filtering the static visual representation to capture intensity differences at specific frequencies represented in the static visual representation and generating a filtered representation of the item of content;
encoding the filtered representation to create a digitized representation of the item of content;
identifying characteristics within the digitized representation that correspond to a rhythm (R), a texture (T), and a pitch (P) within the item of content; and
determining a mood among a plurality of moods that correspond to the R, the T and the P.

2. The method of claim 1, wherein determining a mood includes objectively determining a R-value corresponding to the R, a T-value corresponding to the T and a P-value corresponding to the P, collectively representing a RTP score.

3. The method of claim 2, wherein the RTP score is a RTP vector, and wherein determining includes identifying a mood that corresponds to the RTP vector.

4. The method of claim 2, wherein the RTP score is a RTP vector, further comprising training a machine learning system based on the characteristics within the digitized representation that correspond to the RTP vector.

5. The method of claim 4, further comprising identifying an unknown mood of different items of content by generating, filtering, encoding and identifying the different items of content in accordance with claim 1, and determining the unknown mood with the trained machine learning system.

6. The method of claim 4, further comprising identify unknown moods for a plurality of different items of content by generating, filtering, encoding and identifying each of the plurality of different items of content in accordance with claim 1, and determining the unknown moods of each of the plurality of different items of content with the trained machine learning system.

7. The method of claim 6, wherein the item of content and different items of content are songs or include songs.

8. The method of claim 2, wherein the RTP score is a RTP vector, wherein the item of content is a song or includes a song, wherein the item of content has a first unique identification that is associated with the mood of the item of content that corresponds to the RTP vector, further comprising:
receiving a request to perform generating, filtering, encoding, identifying and determining for a second item of content having a second unique identification that matches the first unique identification; and
based on the request, identifying the mood of the second item of content based on the RTP vector corresponding to the first unique identification.

9. The method of claim 1, wherein the static visual representation is one or more of a spectrogram, a chromagram or an audio fingerprint.

10. A method for identifying characteristics of a rhythm (R), a texture (T) and a pitch (P) for an item of content, comprising:
generating a static visual representation of the content based on frequency data sampled from the content;
filtering the static visual representation to capture intensity differences at specific frequencies represented in the static visual representation and generating a filtered representation of the content;
encoding the filtered representation to create a digitized representation of the content; and
identifying characteristics within the digitized representation that correspond to the R, the T and the P for the item of content.

11. The method of claim 10, further comprising:
sending the identifying characteristics from a first computer to a second computer; and
receiving from the second computer at the first computer a determination of a mood that correspond to the R, the T and the P for the item of content.

12. The method of claim 11, wherein the determination is based on an objective determination of a R-value corresponding to the R, a T-value corresponding to the T and a P-value corresponding to the P, collectively representing a RTP score.

13. The method of claim 12, wherein the RTP score is a RTP vector, and wherein the determination is based on identifying a mood that corresponds to the RTP vector.

14. The method of claim 11, wherein a R-value corresponds to the R, a T-value corresponds to the T and a P-value corresponds to the P, collectively representing a RTP score, wherein the determination is based on a comparison of the RTP score to a plurality of previously determined RTP scores for a plurality of items of content.

15. The method of claim 14, wherein the comparison is also based on a unique identifier associated with the item of content on other unique identifiers associated with each of the plurality of items of content.

16. The method of claim 10, wherein the item of content is a song or includes a song.

17. The method of claim 10, further comprising:
determining a mood that correspond to the R, the T and the P for the item of content; and
including the mood in metadata associated with the item of content.

18. The method of claim 16, wherein the item of content is a song or includes a song.

19. The method of claim 10, further comprising:
determining a mood that correspond to the R, the T and the P for the item of content; and
including the mood in streaming data associated with the item of content.

20. The method of claim 19, wherein the item of content is a song or includes a song.

* * * * *